Patented Oct. 23, 1934

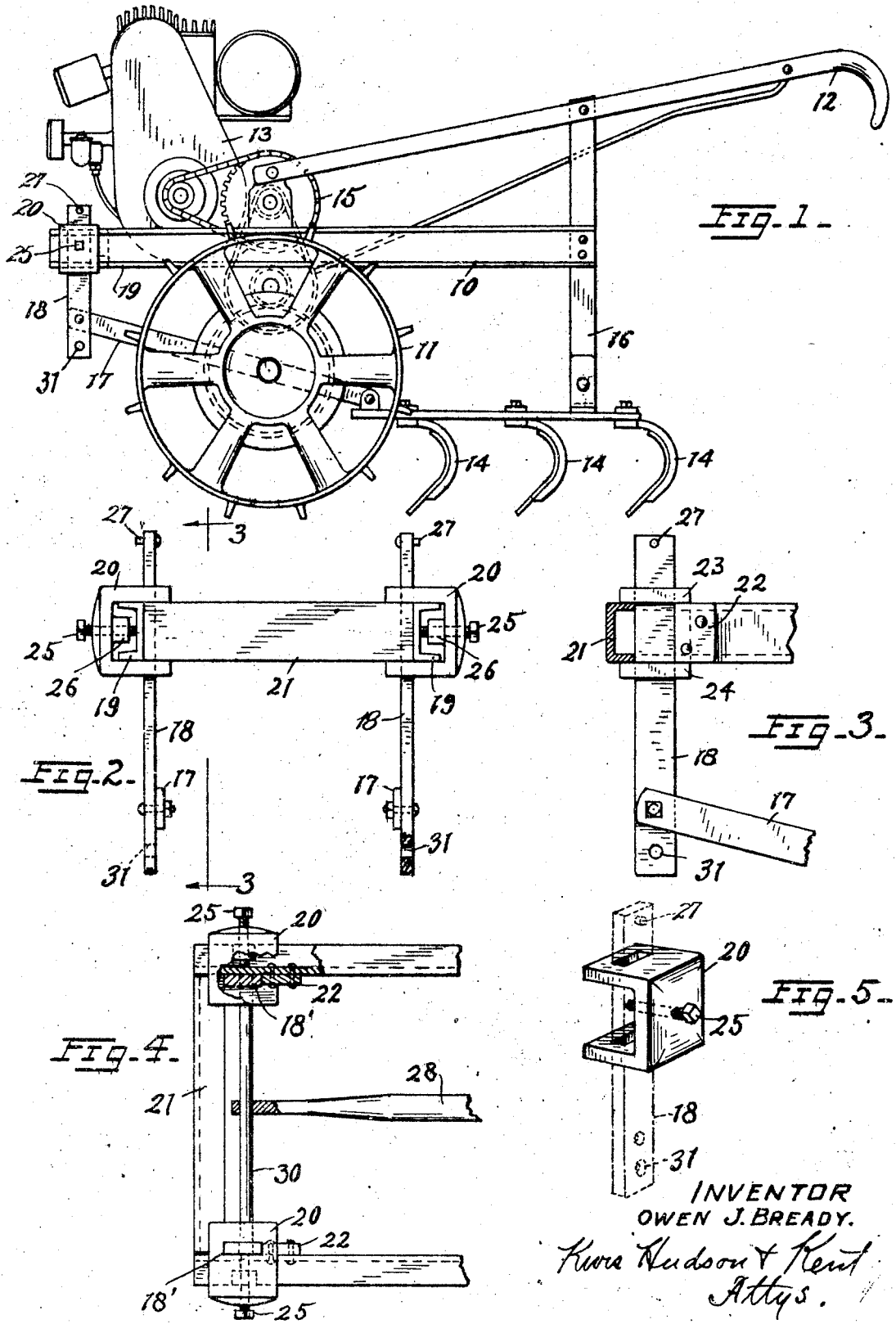

1,978,338

UNITED STATES PATENT OFFICE 1,978,338

TOOL CONNECTION FOR TRAVELING IMPLEMENTS

Owen J. Bready, Cleveland, Ohio

Application January 12, 1933, Serial No. 651,269

1 Claim. (Cl. 97—48)

This invention relates to implements of the type having a traveling carriage for actuating a tool, such as an agricultural tool, and more specifically my invention aims to provide novel means for adjustably connecting the tool with the carriage.

Another object of my invention is to provide an implement, of the type referred to, embodying an improved connection between the tool and carriage, whereby the tool may be readily attached or detached and may be quickly and easily adjusted for regulating the functioning of the tool.

The invention may be further briefly summarized as consisting in certain novel combinations and arrangements of parts hereinafter described and particularly set out in the appended claims.

In the accompanying sheet of drawing,

Fig. 1 is a side elevational view of an implement embodying my novel tool connecting means.

Fig. 2 is a partial front elevational view of the implement.

Fig. 3 is a sectional view taken on the line 3—3 of Fig. 2.

Fig. 4 is a partial plan view of the implement showing another form of tool connected thereto, and Fig. 5 is a perspective view showing my novel tool connecting means detached from the implement.

Detailed reference will now be made to the accompanying drawing showing a traveling implement embodying the novel tool connecting means of my invention, and although in disclosing my invention, I refer particularly to an agricultural implement of the tractor type, it should be understood that my novel tool connecting means may be applied to various forms of tools and to various types of tool actuating carriages.

Before proceeding with a detailed description of my novel tool connecting means I shall describe briefly one form of implement to which this connecting means may be applied. In Fig. 1 of the drawing I have shown such an implement which, in this instance, is in the form of a self-propelling tractor, having a frame 10 supported intermediate its ends upon a pair of traction wheels 11 and adapted to be guided by a pair of handles 12. Power for the propulsion of the carriage is supplied by a suitable motor, such as the internal combustion engine 13, which is preferably mounted on the frame 10 at a point forwardly of the vertical plane passing through the axis of the wheels so as to partially counterbalance the tool 14 which is connected to the frame at a point rearwardly of this vertical plane. Torque may be transmitted from the engine to the traction wheels through a suitable arrangement of gearing 15.

In this instance the tool to be actuated by the tractor is in the form of a toothed cultivator which is connected in any suitable manner to the frame member 16 so that the teeth of the cultivator may be raised or lowered during operation of the implement by means of the handles 12. Motion may be imparted to the tool through one or more draw bars 17 which are preferably arranged to connect the forward end of the tool with the frame 10 at a point forwardly of the vertical plane passing through the axis of the wheels. Connection of the tool with the frame of the tractor at a point forwardly of the wheel axis is desirable because the resistance offered by the tool tends to press the wheels more firmly against the ground, and thereby increases their traction. As thus far described this traveling implement is similar in construction and operation to the power driven implement disclosed in my prior Patent No. 1,817,873, granted August 4, 1931, but in accordance with the present invention I provide an adjustable connection between the tool and the forward part of the tractor frame, such that the tool may be readily attached and detached or quickly and easily adjusted so that the functioning of the tool may be regulated as desired by the operator of the implement.

As shown in Figs. 1, 2 and 3, my improved connecting means comprises a pair of substantially vertically elongated members 18, which extend transversely of the spaced longitudinally extending frame members 19, and which are adjustably held by the clamping devices 20. The members 18 may be of any suitable construction but are preferably in the form of metal bars of such length as to extend below the frame members 19 a sufficient distance to provide a desired adjustment for the tool 14. These members are retained by, and guided between, the transverse frame element 21 and guide blocks 22, which blocks are riveted or otherwise secured to the longitudinal frame elements 19 in spaced relation to the transverse frame element 21.

The clamping devices 20 may be of any suitable form, but are preferably of substantially U-shape having spaced arms 23 and 24 disposed above and beneath the longitudinal frame elements 19. The arms of each yoke are provided with aligned openings arranged so that the members 18 may be extended through the yoke arms inwardly of the longitudinal frame elements, as shown in Fig. 2 of the drawing. Wedging means, preferably in the form of a screw 25, is provided for moving the yokes relative to the frame elements 19 to exert a clamping action on the elongated members 18. In this instance the screws 25 are arranged to extend inwardly through the bosses 26 of the yokes and to engage the longitudinal frame elements 19. From the arrangement as just described it will be seen that by releasing screws 25 the members 18 may be slid downwardly through the openings of their respective yokes to thereby vary the point of connection for the tool and thus regulate the functioning of the tool. When the tool is in the form of the cultivating attachment shown in Fig. 1 the lowering of the members 18 will cause the cultivating teeth to dig into the earth for a greater depth than when the members 18 are adjusted upwardly. When a desired adjustment of the tool has been attained, the screws 25 are tightened, thereby locking the connecting means in the desired position. Complete disengagement of the adjustable members 18 may be prevented by providing these members with suitable stops such as the rivets 27 at the upper ends thereof, which stops prevent these members from dropping out of the openings of the yokes when the screws 25 are loosened.

Although I have described my improved implement as embodying a cultivating tool which is operably connected with the adjustable members 18 by means of the draw bars 17, it should be understood, however, that various other forms of tools may be substituted for this cultivating tool, and that the various tools may be connected to the adjustable members 18 by the use of draw bars 17 or by any other suitable means. As an example of another form of tool which may be actuated by the tractor through my adjustable connecting means, I have shown, in Fig. 4 of the drawing, the beam 28 of a plow as being connected to adjustable members 18' by means of a rod 30 extending transversely through the beam and through suitable openings provided adjacent the lower ends of the adjustable members, such as the openings 31 shown in Figs. 2 and 3.

When the tool is actuated from the traveling carriage by being direct-connected to the members 18, it will be seen that vertical adjustment of these members directly varies the position of the tool relative to the frame of the carriage. When the tool is actuated from the carriage by means of draw bars, as shown in Fig. 1, it will be seen that vertical adjustment of the members 18 varies the angularity of the draw bars and thereby alters the position of the tool relative to the frame. Vertical adjustment of the members 18 thus regulates the functioning of the tool, which may be a regulation of the depth of soil penetration when the tool is a cultivator, plow or the like, or may be a regulation of the cutting plane when the tool is a mower or the like.

It should now be readily understood from the accompanying drawing and the foregoing description that I have provided a simple and efficient form of adjustable connection for connecting a tool with a traveling carriage in such a manner that any appropriate tool may be readily attached to or detached from the carriage, and such that the tool being operated by the carriage may be readily adjusted to obtain a desired functioning of the tool. It will be seen, further, that because of the simplicity of construction of my improved connecting means, adjustment of the tool may be quickly and easily made by an inexperienced operator, and that such adjustment requires only the use of an ordinary wrench.

While I have illustrated and described the apparatus of my invention in a detailed manner, it should be understood, however, that I do not wish to be limited to the precise details of construction and arrangements of parts illustrated and described, but regard my invention as including such changes and modifications as do not involve a departure from the spirit of the invention and the scope of the appended claims.

Having thus described my invention, I claim:

In a traveling implement of the character described, the combination of a frame having substantially horizontally extending connected frame members, a guide part on one frame member in spaced relation to the other frame member, an elongated tool connecting member disposed between said guide part and said one frame member and extending above and below the frame members, a tool having operative connection with said elongated member, and means for adjustably connecting said elongated member with said one frame member comprising a substantially U-shaped yoke having arms disposed above and below said one frame member and also having an arm connecting portion disposed at one side of said one frame member, said arms being provided adjacent their ends with openings in substantial alignment with each other at the side of said one frame member opposite the arm connecting portion of the yoke and through which openings the tool connecting member extends, and a clamping screw threaded through the arm connecting portion of the yoke and engaging one side of said one frame member for clamping the tool connecting member against the other side of said one frame member.

OWEN J. BREADY.